(No Model.)

J. H. TALMADGE.
SPRING VEHICLE.

No. 405,857. Patented June 25, 1889.

WITNESSES:
C. L. Bendixon
J. J. Laass

INVENTOR:
Joseph H. Talmadge
BY
Duell, Laass & Duell
ATTORNEYS

UNITED STATES PATENT OFFICE.

JOSEPH H. TALMADGE, OF CORTLAND, NEW YORK.

SPRING-VEHICLE.

SPECIFICATION forming part of Letters Patent No. 405,857, dated June 25, 1889.

Application filed December 13, 1888. Serial No. 293,501. (No model.)

*To all whom it may concern:*

Be it known that I, JOSEPH H. TALMADGE, of Cortland, in the county of Cortland, in the State of New York, have invented new and useful Improvements in Spring-Vehicles, of which the following, taken in connection with the accompanying drawings, is a full, clear, and exact description.

This invention relates to the class of vehicles which have longitudinal springs carried at their central portions on supports between the running-gears, and both of the end portions of the springs vibratory vertically, and the body carried on the said end portions of the springs; and the invention consists in an improved construction and combination of parts, as hereinafter fully described, and specifically set forth in the claims.

Figure 1:
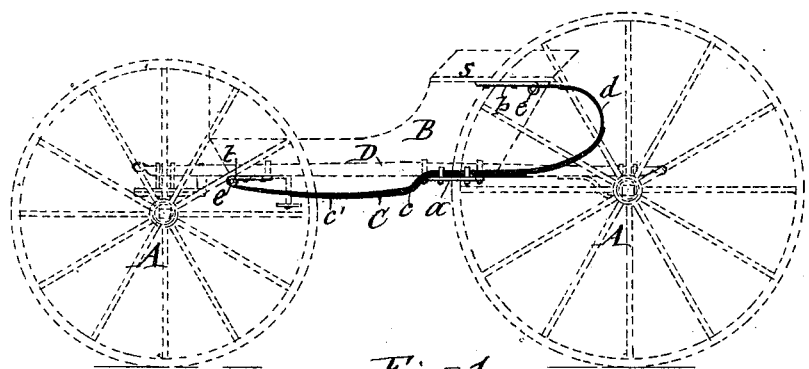
Figure 2:
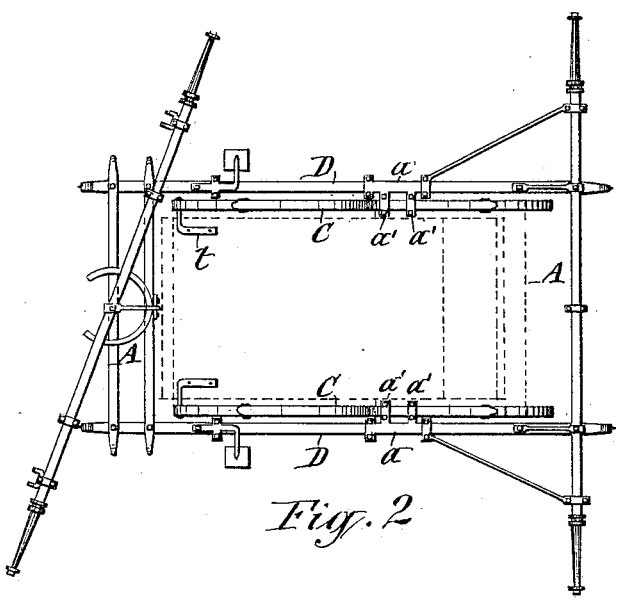
Figure 3:
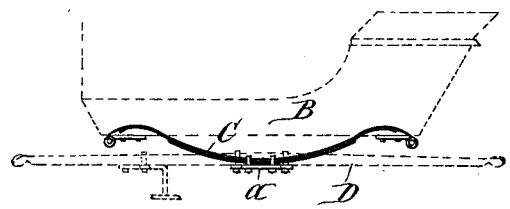

In the annexed drawings, Figure 1 is a side elevation of a vehicle embodying my invention, the running-gears, side bars, and body being shown by dotted lines. Fig. 2 is an inverted plan view of the vehicle minus the body and wheels, and Fig. 3 illustrates a modification of my invention.

Similar letters of reference indicate corresponding parts.

A A represent the front and rear running-gears, and D D the side bars connected to said running-gears in the usual and well-known manner. To the under side of the side bars, between the two running-gears, are rigidly secured plates $a$ $a$, which are formed with short inward projections $a'$ $a'$.

C C denote side springs, which I locate between the side bars and sides of the body and secure them at the center of their lengths to the aforesaid projections $a'$ $a'$, the springs being firmly attached to the aforesaid projections of the plates, either by clips, as shown, or by bolts or rivets passing through said parts.

The springs C C may be of any desired shape, two different shapes being illustrated in Figs. 1 and 3 of the drawings, the latter figure showing the spring of a form similar to the so-called "semi-elliptic spring." In either case, however, both end portions of each spring are vibratory vertically and carry the body B.

Figs. 1 and 2 illustrate my preferred form of the spring C, and consists in a downward deflection thereof immediately in front of the central support of the spring, as shown at $c$, and a forward extension $c'$ from said deflection, and an upward and forward curvature $d$ of the rear end portion of the spring, the ends being formed with the shackle-eyes $e$ $e$, one of which is coupled to a stirrup $t$, attached to the under side of the front portion of the body, and the other eye $e$ is coupled to an arm $b$, which is attached to the under side of a projection of the seat $s$, over the side of the body.

Having described my invention, what I claim as new, and desire to secure by Letters Patent, is—

1. In combination with the two running-gears and side bars D D, the plates $a$ $a$, fastened to the under side of the side bars between the front and rear running-gears and formed with the inner projections $a'$ $a'$, the side springs C C, secured at their central portions to the aforesaid projections and having their end portions vibratory vertically, and the body B, carried between the springs and by the end portions thereof, substantially as described and shown.

2. In combination with the front and rear running-gears and side bars D D, the side springs C C, supported at their central portions on said side bars and having their front end portions deflected downward and forward and the rear ends curved upward and forward, and the body carried on the ends of said springs, substantially as described and shown.

In testimony whereof I have hereunto signed my name, in the presence of two witnesses, at Cortland, in the county of Cortland, in the State of New York, this 10th day of December, 1888.

JOSEPH H. TALMADGE. [L. S.]

Witnesses:
 J. E. EGGLESTON,
 L. P. HALLENBECK.